No. 888,258. PATENTED MAY 19, 1908.
E. A. PATTERSON & E. F. DICKINSON.
SAW HANDLE.
APPLICATION FILED MAY 1, 1907.
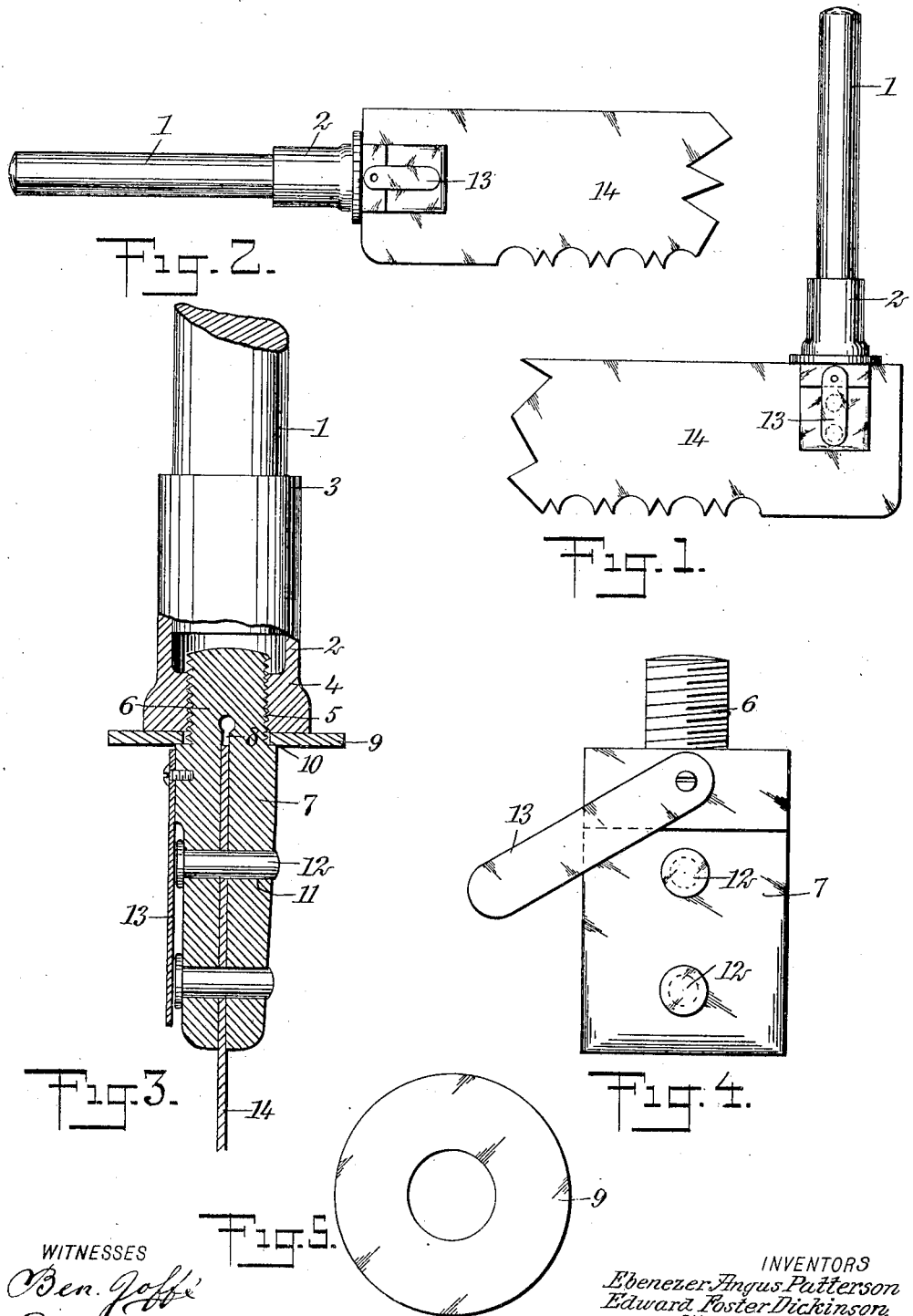
WITNESSES
INVENTORS
Ebenezer Angus Patterson
Edward Foster Dickinson
BY
Munn & Co.
ATTORNEYS

UNITED STATES PATENT OFFICE.

EBENEZER ANGUS PATTERSON, OF MORGAN CITY, AND EDWARD FOSTER DICKINSON, OF MATHEWS, LOUISIANA.

SAW-HANDLE.

No. 888,258.  Specification of Letters Patent.  Patented May 19, 1908.

Application filed May 1, 1907. Serial No. 371,309.

*To all whom it may concern:*

Be it known that we, EBENEZER ANGUS PATTERSON and EDWARD FOSTER DICKINSON, both citizens of the United States, and residents, respectively, of Morgan City, in the parish of Saint Mary and State of Louisiana, and of Mathews, in the parish of Lafourche and State of Louisiana, have invented an Improved Saw-Handle, of which the following is a full, clear, and exact description.

Our invention relates to saw and other tool handles, and has for its object to provide a handle which can be readily and firmly adjusted at right angles or in alinement with the saw blade or tool, or which can be quickly separated therefrom.

Other objects of the invention are to provide a durable handle which can be manufactured very cheaply; one that can be used on saw blades of different makes; and one which will permit the saw to be carried without difficulty through the woods because it can be arranged so as not to have any members projecting at right angles to the main body of the saw.

In this specification, we will describe one form of our invention which is shown in the accompanying drawings, but we do not limit ourselves thereto, as we consider ourselves entitled to all forms and embodiments of the invention which may be held to fall within the scope of the appended claims.

In the drawings similar characters of reference refer to the same features in all the figures, in which Figure 1 is a view of an end of a saw with the handle adjusted at right-angles thereto; Fig. 2 is a view of an end of a saw with the handle adjusted in alinement therewith; Fig. 3 is an enlarged sectional view of the fastening members of the handle with a saw in position; Fig. 4 is a view showing the keeper on one of the arms of the saw receiving members, and Fig. 5 is a view of the washer shown in section in Fig. 3.

Referring to the drawings, 1 is the handle, which may be made of wood or other suitable material and which is fitted to the hollow base 2, by forcing or driving it into the opening which is at the terminal 3 having the smaller diameter. The other terminal 4 of the base 2 has a greater outside diameter which extends for a short distance from the terminal, and the inner diameter of the base for this distance is smaller than that of the main body of the base. This portion 4 of the base 2 has a female screw 5 which is adapted to receive the male screw 6 of the saw receiving member 7. This member has slot 8 which is of the thickness of a saw blade, the said slot extending longitudinally from one end of the saw receiving member to the other and to within a short distance of the terminal of the male screw 6. As will be seen by examining the drawings, the sides of the saw receiving member are relatively long to secure a firm hold on the saw. The washer 9 fits around the male screw 6 between the base 2 and main body of the saw receiving device, the latter having a shoulder 10 which prevents the washer from slipping over the main body of the saw gripping member. Transverse holes 11 are bored through the saw gripping member 7 and pins 12 are provided to fit the said holes. A keeper 13 is also provided to press against the heads of the pins and prevent them from becoming displaced. This keeper is pivoted at one end so that it can be moved free from the pins when the saw is to be adjusted.

In using our invention, a saw 14 is inserted in the slot 8 in the saw receiving member 7 and the holes in the saw are made to register with the transverse holes 11 in the gripping member. Pins 12 are then pushed through the several holes and the keeper 13 is moved over the heads of the pins to keep them in place. The washer 9 is then adjusted over the shoulder 10 and the hollow base 4 of the handle is screwed down on the washer. The washer is pressed down on the edge of the saw by the act of screwing down the handle and the saw is thereby secured rigidly to the handle, it being prevented from rotating relatively to the handle by the long sides of the saw-gripping member, which are in contact with the respective sides of the saw blade and it is unable to move in a perpendicular direction relatively to the handles by the washer. The saw is therefore securely fastened to the handle. Different makers of saws punch the holes in the saw blades at different distances from their terminals; but with our arrangement, these differences will not prevent the saw from being rigidly fastened to the handle either at right angles thereto or in alinement therewith. The deep slot permits the handle to receive the different saw blades and they are secured firmly by placing the pins in position and by screwing down the handle with the washer in position.

Having thus described our invention, we claim as new and desire to secure by Letters Patent:

1. A fastening for tools, comprising in combination, a tool receiving member which has a threaded stem of less diameter than the body of the tool receiving member, the said tool receiving member having a slot extending through one of its terminals to receive the blade of the saw, transverse holes in the slotted portion of the said tool receiving member, a detachable pin adapted to fit the said holes, a keeper adapted to lie close to the tool receiving member and which when in position will retain the pin in the said holes, a straight handle having a nut-like portion adapted to enmesh with the threaded stem piece when the handle is in alinement therewith, and a washer, the hole in which is less in diameter than the body of the tool receiving member, the said washer being disposed on the threaded stem of the tool receiving member and being adapted to be pressed down on the body of the tool receiving member by the nut-like portion of the handle with which it is in contact.

2. A fastener for tools, comprising a tool receiving member, rigid on a threaded stem, the said tool-receiving member being slotted to receive a saw blade, the said slotted portions of the tool-receiving member having extensive surfaces to prevent any relative rotary movements of the saw blade, transverse holes in the slotted portions of the tool-gripping member, adapted to register with the fastening holes in the saw blade, detachable pins adapted to fit the said holes, a straight handle with a nut-like portion at one end adapted to screw on the threaded stem when in alinement therewith, and a washer with a large surface, adapted to be disposed on the threaded stem and be pressed against the edge of the saw blade when the handle is screwed down on the stem of the tool-gripping member, to prevent any movement of the saw blade in the plane of the slot in the tool-gripping member.

In testimony whereof we have signed our names to this specification in the presence of two subscribing witnesses.

EBENEZER ANGUS PATTERSON.
EDWARD FOSTER DICKINSON.

Witnesses to the signature of Ebenezer Angus Patterson:
  H. A. BASS,
  LÉON KAHN.

Witnesses to the signature of Edward Foster Dickinson:
  J. D. BRIANT,
  B. S. NORTON.